United States Patent
Seko et al.

(10) Patent No.: US 7,217,086 B2
(45) Date of Patent: May 15, 2007

(54) COOLING FLUID PUMP

(75) Inventors: Katsuya Seko, Yokohama (JP); Kenichi Ito, Zama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 11/214,057

(22) Filed: Aug. 30, 2005

(65) Prior Publication Data

US 2006/0120863 A1  Jun. 8, 2006

(30) Foreign Application Priority Data

Aug. 30, 2004 (JP) .............................. 2004-250871

(51) Int. Cl.
*F04D 5/00* (2006.01)
*F04D 29/42* (2006.01)

(52) U.S. Cl. ..................... 415/55.4; 415/177; 415/203; 415/224

(58) Field of Classification Search ............... 415/55.1, 415/55.2, 55.3, 55.4, 55.5, 55.6, 55.7, 208.1, 415/224, 203, 177
See application file for complete search history.

(56) References Cited

U.S. PATENT DOCUMENTS

2004/0105232 A1* 6/2004 Ito et al. ..................... 361/687

FOREIGN PATENT DOCUMENTS

| JP | A-2001-123978 | 5/2001 |
| JP | A-2001-132677 | 5/2001 |

* cited by examiner

*Primary Examiner*—Richard A. Edgar
(74) *Attorney, Agent, or Firm*—Pillsbury Winthrop Shaw Pittman, LLP

(57) ABSTRACT

A cooling fluid pump includes a casing having a cylindrical pump chamber inside and an outer surface, the pump chamber having an inner surface, an impeller mounted rotatably inside the pump chamber and having a number of pump vanes, the impeller further having an axial end, a fluid path defined around the impeller in the pump chamber so that a fluid flows through the fluid path upon rotation of the impeller, a discharge port formed in the casing for discharging the fluid inside the fluid path and a suction port formed in the casing for suctioning the fluid into the fluid path upon rotation of the impeller, a protrusion formed on a portion of the inner surface of the pump chamber opposed to the axial end of the impeller, thereby separating the fluid discharged from the discharge port and the fluid suctioned from the suction port as well as pressuring the fluid flowing in the fluid path, and a heat receiving portion formed on a part of the outer surface of the casing overlapping the protrusion.

18 Claims, 6 Drawing Sheets

COOLING FLUID PUMP

CROSS-REFERENCE TO RELATED APPLICATIONS

This application is based upon and claims the benefit of priority from the prior Japanese Patent Application No. 2004-250871, filed on Aug. 30, 2004 the entire contents of which are incorporated herein by reference.

BACKGROUND OF THE INVENTION

1. Field of the Invention

The present invention relates to a cooling fluid pump for cooling an object to be cooled by contacting the object to an outer surface of a casing. The invention more particularly relates to a cooling pump used in a cooling device for cooling a heating member of an electrical appliance such as a computer.

2. Description of the Related Art

A fluid pump is composed of a casing having a pump chamber inside, a suction port and a discharge port provided in the casing and an impeller arranged rotatably in the pump chamber having pump vanes and pump grooves. A liquid suctioned into the pump chamber from the suction port by rotation of the impeller flows through a fluid path and is discharged from the discharge port. A protrusion is provided in an area in between the suction port and the discharge port in the fluid path and the protrusion applies pressure to the liquid flowing through the fluid path.

The fluid pump having such configuration is described in JP-A-2001-123978 and JP-A-2001-132677.

In case the fluid pump is used as a cooling device for a CPU, which is a heat generating member of an electronic appliance for example, a personal computer, the CPU is mounted on the casing of the pump via a heat diffusing plate. Such configuration conveys the heat generated by the CPU to the casing via the heat diffusing plate and releases the heat by exchanging the heat between the casing and the liquid flowing through the fluid path.

Therefore, in order to efficiently cool the heat generation member, the heat exchange rate between the objects to be cooled such as the heat generating member and the heat diffusing plate and the liquid flowing through the fluid path needs to be improved.

SUMMARY OF THE INVENTION

Therefore, an object of the present invention is to provide a cooling fluid pump, a cooling device and an electronic appliance providing an improved heat exchange rate between the object to be cooled and each of the pump, cooling device and the electrical appliance.

The present invention provides a cooling fluid pump comprising a casing having a cylindrical pump chamber inside and an outer surface, the pump chamber having an inner surface; an impeller provided rotatably inside the pump chamber and having a number of pump vanes, the impeller further having an axial end; a fluid path defined around the impeller in the pump chamber so that a fluid flows therethrough upon rotation of the impeller; a discharge port provided in the casing for discharging the fluid inside the fluid path and a suction port provided in the casing for suctioning the fluid into the fluid path upon rotation of the impeller; a protrusion provided on a portion of the inner surface of the pump chamber opposed to the axial end of the impeller, thereby separating the fluid discharged from the discharge port and the fluid suctioned from the suction port as well as pressuring the fluid flowing in the fluid path; and a heat receiving portion provided on a part of the outer surface of the casing overlapping the protrusion.

The invention also provides a cooling device comprising the cooling fluid pump having the above-described configuration, a fluid pipe having both ends connected to the suction port and the discharge port respectively, and a heat dissipating member provided in the fluid pipe.

The invention further provides an electrical appliance comprising the cooling fluid pump having the above-described configuration, a fluid pipe having both ends connected to the suction port and the discharge port respectively, and a heat generating member directly or indirectly contacting the heat receiving portion of the casing.

BRIEF DESCRIPTION OF THE DRAWINGS

Other objects, features and advantages of the present disclosure will become clear upon reviewing the following description of the embodiment example with reference to the accompanying drawings, in which.

DETAILED DESCRIPTION OF THE INVENTION

Figure 1:
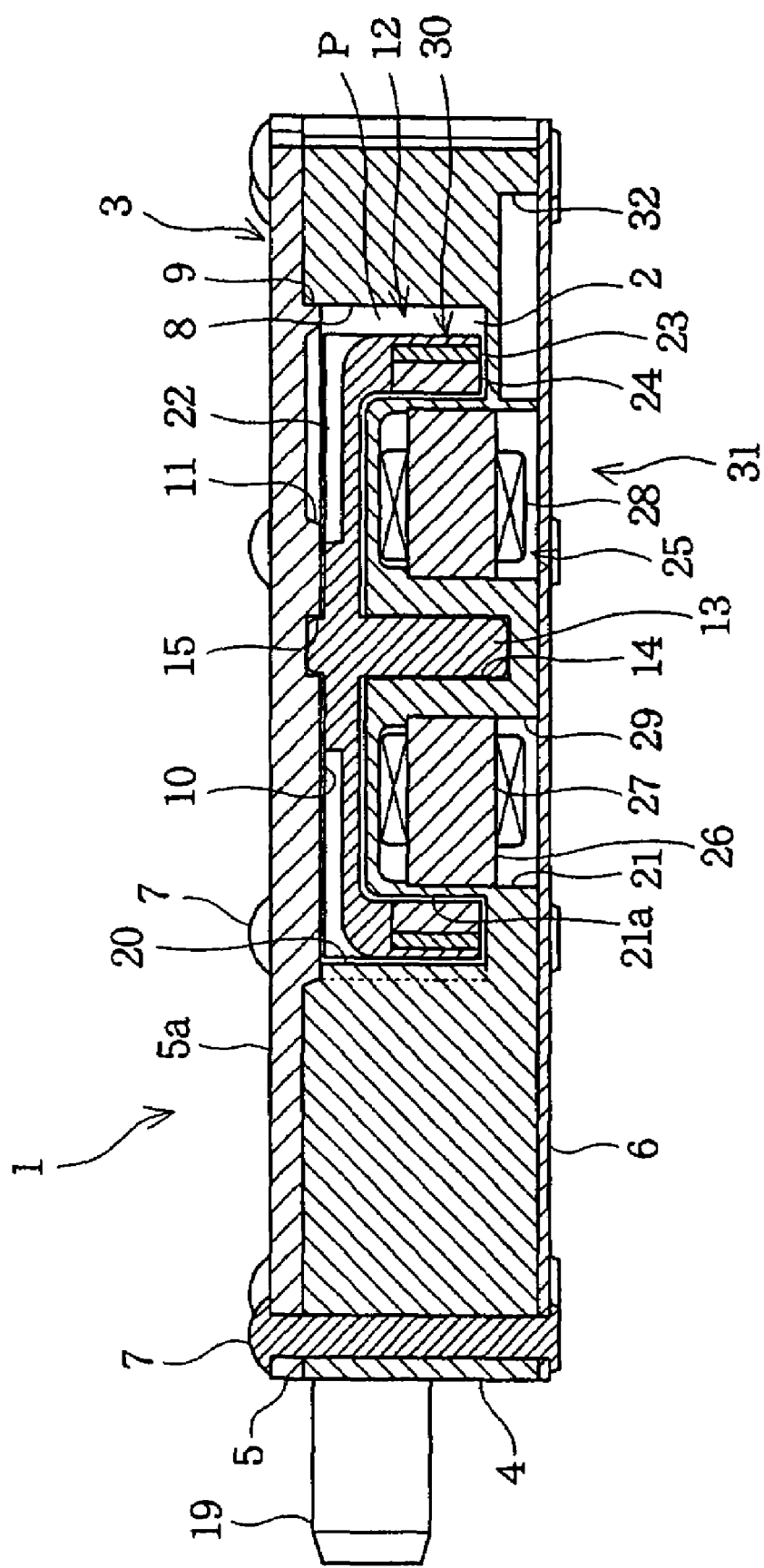
FIG. 1 is a vertical sectional view of a cooling fluid pump according to a first embodiment of the present invention.
Figure 2:
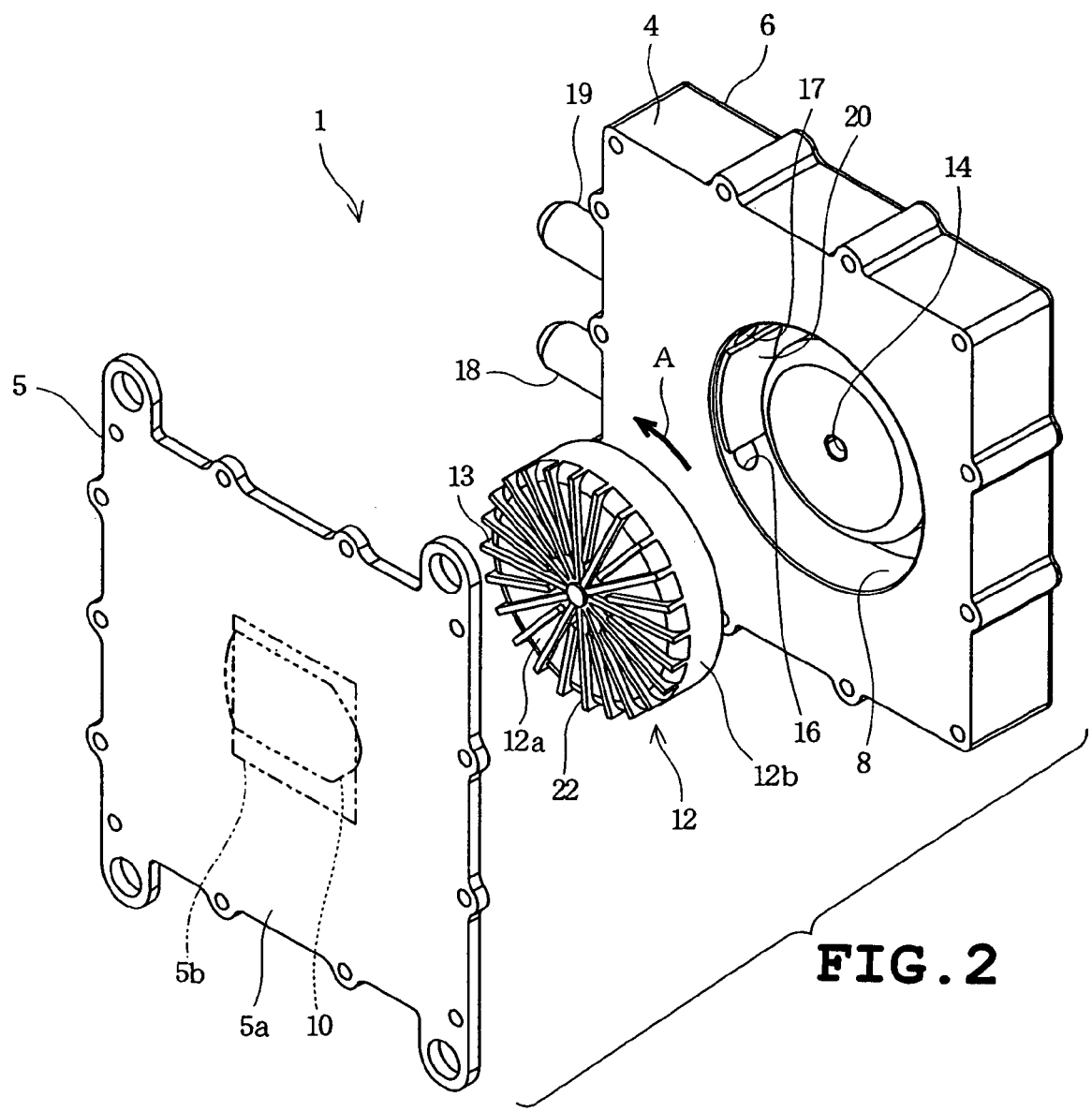
FIG. 2 is an exploded perspective view of a fluid pump viewed from a heat receiving plate side.
Figure 3:
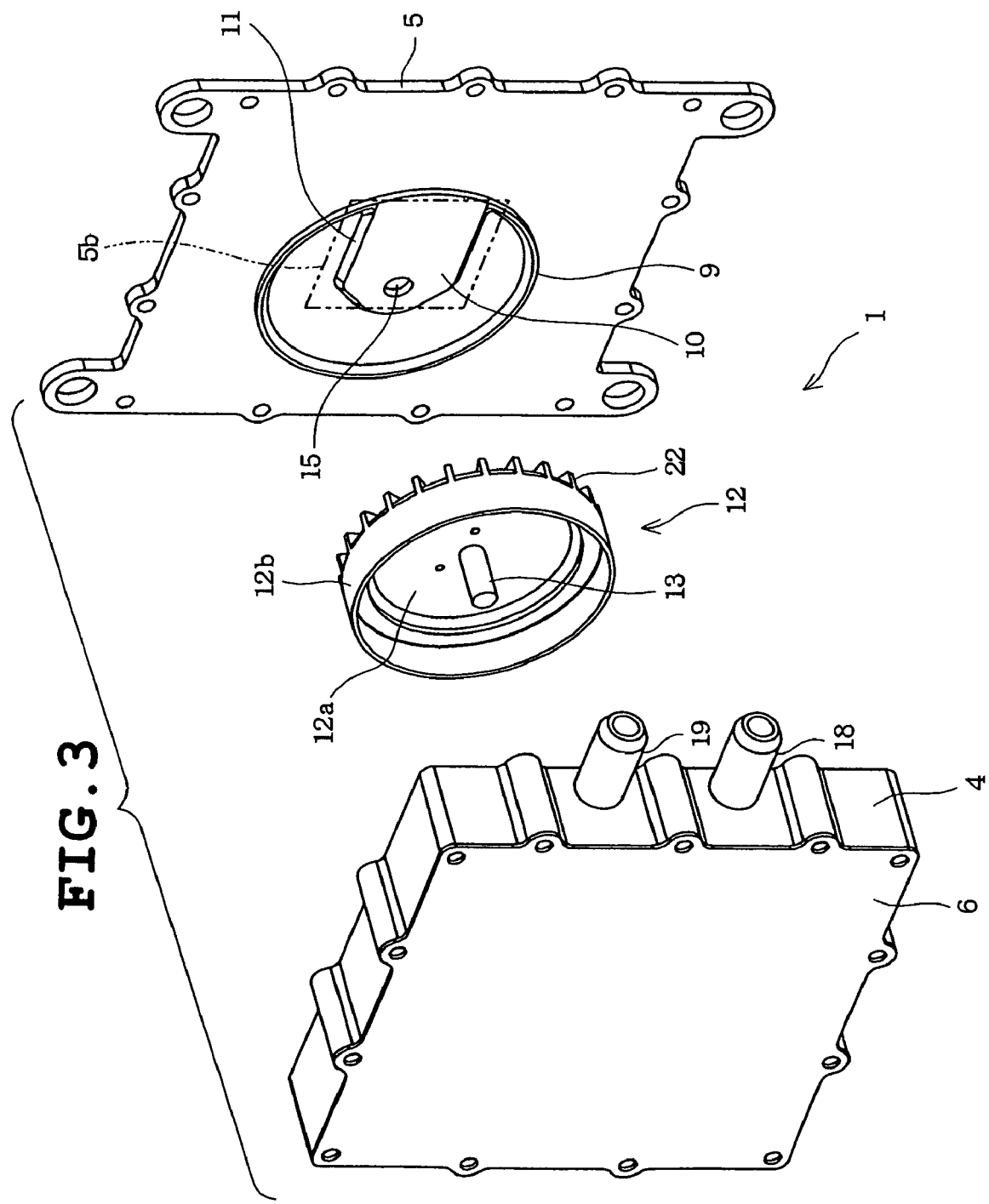
FIG. 3 is an exploded perspective view of the fluid pump viewed from a bottom plate side.
Figure 4:
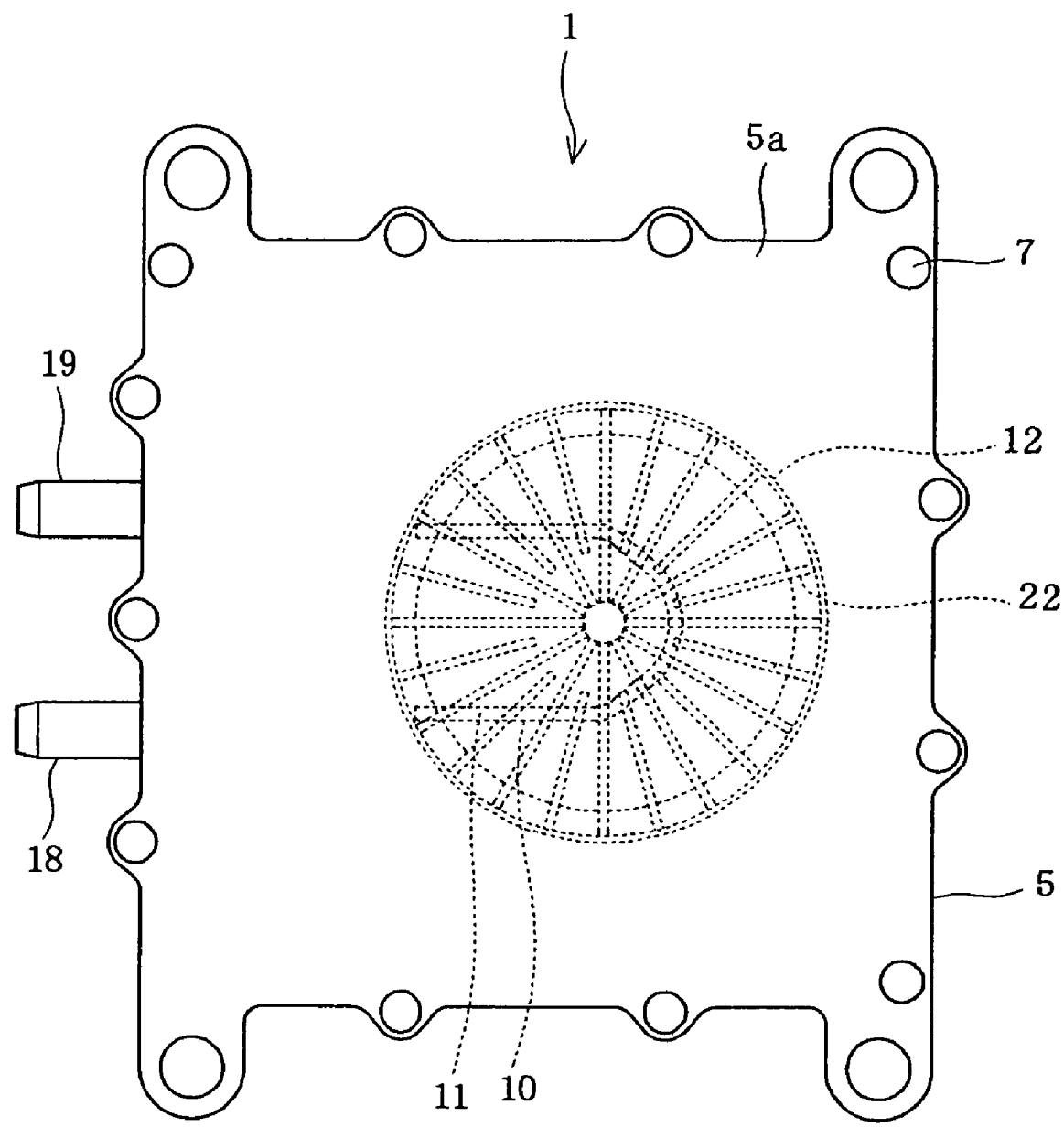
FIG. 4 is an upper surface view of the fluid pump.

A first embodiment of the present invention is described hereinafter with reference to FIGS. 1 to 5. First, a configuration of a cooling fluid pump according to the present embodiment will be described. A fluid pump 1 is provided with an approximate oblong box-form casing 3 having a pump chamber 2 therein. The casing 3 is composed by connecting a heat receiving plate 5 and a bottom plate 6 with a plurality of fastening members, for example rivets 7. In FIGS. 2 and 3, the rivets 7 are not shown.

The pump chamber 2 is formed by covering a circular recess 8 formed on a case 4 with a heat receiving plate 5. The heat receiving plate 5 has an annular protrusion 9 fitting into the recess 8 when the heat receiving plate 5 is mounted on the case 4. Also, inside the annular protrusion 9 of the heat receiving plate 5, a protrusion 10 is provided. The protrusion 10 extends from an inner circumferential surface of the annular protrusion 9 to a portion beyond the center of the pump chamber 2. The portion extending from the inner circumferential surface of the annular protrusion 9 to a vicinity of the center of the pump chamber 2 has a generally consistent width, whereas the portion beyond the vicinity of the center is tapered. Also, a side portion of the protrusion 10 is formed into a smooth slope 11.

The heat receiving plate 5 is formed integrally by a single metal plate, and a surface in the opposite of the surface formed with the protrusion 10 is referred to as a heat receiving surface 5a. Also, an area corresponding to the protrusion 10 in the heat receiving surface 5a of the heat receiving plate is particularly referred as a heat receiving portion 5b. The heat receiving portion 5b is disposed so that a center thereof is located outside a center of the pump chamber 2. In the present embodiment, the center of the pump chamber 2 is arranged to be displaced from the center of the casing 3 in the radial direction so that the center of the heat receiving portion 5*b* is located in the vicinity of the center of the casing 3.

An impeller 12 is arranged rotatably in the pump chamber 2. A rotational axis 13 of the impeller 12 is located in the center of the pump chamber 2. The rotational axis 13 supported by a bearing 14 and 15 is provided in the case 4 and the heat receiving plate 5 respectively.

A suction port 16 and a discharge port 17 extending from the pump chamber 2 to one of the side surfaces of the case 4 are provided in the case 4. The suction port 16 and the discharge port 17 are provided inside the heat receiving plate 5 side of the case 4. A cylindrical suction port body 18 and a discharge port body 19 are connected respectively to openings of the suction port 16 and the discharge port 17 on one of the side surfaces of the case 4. The suction port body 18 and discharge port body 19 are provided approximately vertically to one of the side surfaces of the case 4.

A protrusion 20 is provided in between the suction port 16 and the discharge port 17 on the inner circumferential surface of the recess 8 of the case 4. The protrusion 10 is arranged to be located above the protrusion 20 when the heat receiving plate 5 is mounted on the case 4.

In the lower surface of the case 4, a stator housing 21 is formed. The stator housing 21 is located in a central portion of the recess 8 and is formed as to cave into the recess 8. Such configuration forms the pump chamber 2 in between surrounding portions of the stator housing 21 and an end surface of the heat receiving plate 5 side and the heat receiving plate 5. Corresponding to such configuration of the pump chamber 2, the impeller 12 is composed of a disc 12*a* and a cylindrical portion 12*b* located on the outer circumferential surface of the disc 12*a*. The stator housing 21 is located in the portion surrounded by the disc 12*a* and the cylindrical portion 12*b*.

An outer circumferential edge of the disc 12*a* of the impeller 12 is formed in a circular arc surface. Also, a number of pump vanes 22 are provided on an upper surface of the disc 12*a* so as to extend radially. Each pump vane 22 opposes the protrusions 10 and 20 by the rotation of the impeller.

A rotor yoke 23 in a ring form is fixed to the inner circumferential surface of the cylindrical portion 12*b* of the impeller 12 and rotor magnets 24 in a ring form is fixed to the inner circumferential surface of the rotor yoke 23. The rotor magnets 24 are magnetized for example, in 8 poles and N poles and S poles are arranged alternately.

A stator 25 is housed in the stator housing 21. The stator 25 includes a stator core 27 having plurality of teeth 26 and a coil 28 wound on the teeth 26. An attachment protrusion 29 is provided on the central portion of the stator housing 21 and the stator core 27 is fixed on the attachment protrusion 29.

The outer circumferential surface of the teeth 26 opposes the inner circumferential surface of the rotor magnets 24 with a surrounding wall 21*a* therebetween. In the present embodiment, the rotor 30 includes the impeller 12, the rotor yoke 23 and the rotor magnets 24 and a motor 31 includes the rotor 30 and the stator 25. In the lower surface of the case 4, a housing recess 32 is formed in a portion adjacent to the stator housing 21, housing a control circuit (not shown) of a motor 31. The stator housing 21 and the housing recess 32 is covered by a bottom plate 6 mounted on the lower surface of the case 4.

Figure 5:
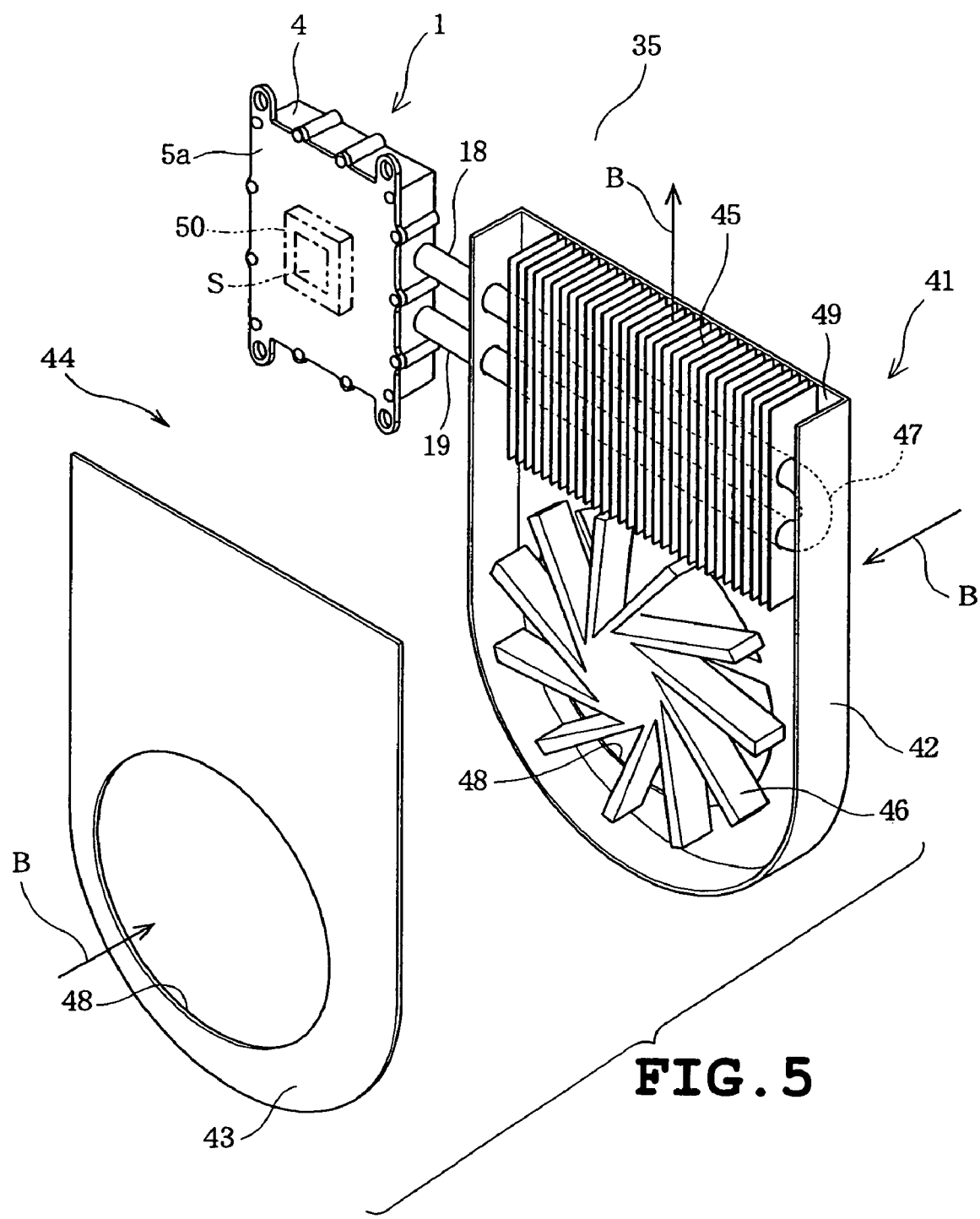
FIG. 5 is a perspective view showing an example of a cooling device composed by the fluid pump.

FIG. 5 shows an example of a cooling device 35 applied with the fluid pump 1 of the above described configuration. As shown in FIG. 5, the cooling device 35 is composed of the fluid pump 1 and a heat dissipater 41. The heat dissipater 41 has a unit case 44 composed by assembling a fan case 42 and a cover 43. Plurality of heat dissipating fins 45 (corresponding to a heat dissipating member) and fans 46 are provided on the upper and lower portion of the fan case 42. A fan motor (not shown) is incorporated in the fans 46. Also a U-shaped fluid pipe 47 is provided in the fan case 42. The fluid pipe 47 penetrates each heat dissipating fins 45. One end of the fluid pipe 47 is connected to the suction port body 18 of the fluid pump 1 and the other end is connected to the discharge port body 19.

A cooling liquid is sealed into the fluid pipe 47 and the pump chamber 2 of the fluid pump 1. The liquid in the pump chamber 2 mainly flows through the space between the outer surface of the disc 12*a* and the cylindrical portion 12*b* of the impeller 12 and the inner surface of the pump chamber 2. Hereinafter, the space mainly occupied by the flowing liquid is referred as a liquid path P.

A circular air inlet 48 is formed in a portion corresponding to the fan 46 in the fan case 42 and the cover 43. Also, the upper portion of the fan case 42 is opened forming an air outlet 49.

Next, an operation of cooling an object to be cooled using the above cooling device 35 will be described. Here, the cooling of a heat generator having a heat diffusing plate is taken as an example for describing the cooling operation. The heat diffusing plate is mounted on the heat generator to diffuse the heat of the heat generator and a temperature of the area inclusive of a contact area of the heat generator becomes high. Therefore, the heat generator is mounted on the heat receiving surface 5*a* of the fluid pump 1 via a heat diffusing plate. At this point, the heat diffusing plate contacts the heat receiving surface 5*a* such that the high temperature area of the heat diffusing plate approximately overlaps the heat receiving portion 5*b*. In FIG. 5, the heat diffusing plate 50 mounted on the heat receiving surface 5*a* of the fluid pump 1 and the high temperature area S thereof is shown in a two-dot chain line.

The impeller 12(rotor 30) is rotated in the direction of an arrow A (refer FIGS. 2 and 3) by energizing the coil 28 of the fluid pump 1. Then, the liquid in the pump chamber 2 flows through the liquid path P by the liquid pumping operation of the impeller. At this point, a portion of the liquid flowing further to the discharge port 17 side from the protrusions 10 and 20 is pressed by the pump vanes 22 and collides with the protrusions 10 and 20. Hence the liquid is pressured, consequently having increased flow speed and discharged to the fluid pipe 47 via the discharge port 17 and the discharge port body 19. Also, some portion of the liquid passes between the protrusions 10 and 20 and the pump vanes 22 and circulates the liquid path P. That is, the liquid inside the pump chamber 2 circulates the liquid path P while circulating between the liquid path P and the fluid pipe 47 by flowing in and out from the suction port 16 and discharge port 17.

At this point, the heat generated by the heat generator and conveyed to the heat diffusing plate 50 is absorbed by the liquid flowing through the liquid path P via the heat receiving plate 5. On the other hand, the heat diffusing plate 50 is mounted on the heat receiving surface 5*a* such that the high temperature area S overlaps with the heat receiving portion 5*b* and the heat receiving portion 5*b* is provided in the portion corresponding to the protrusion 20 of the heat receiving surface 5*a*. Therefore, the heat conveyed to the heat receiving plate 5 is absorbed mainly by the liquid passing between the protrusions 10 and 20 and pump vanes 22 of the liquid path P. The area between the protrusions 10 and 20 and the pump vanes 22 of the liquid path P has a smaller sectional area compared to other portions and the flow speed of the liquid is increased. Hence, the heat of the heat generator and the heat diffusing plate 50 are exchanged effectively with the liquid passing through the liquid path P.

On the other hand, in the heat dissipater 41, upon rotationally driving the fan 46 with the fan motor, as show by an arrow B in FIG. 5, the air near the unit case 44 is suctioned into the unit case 44 by an air inlet 48 by the air blowing operation of the fan 46. Also, the air inside the unit case 44 is exhausted from an air outlet 49 through each heat dissipating fin 45. Therefore, the liquid inside the liquid path P with increased temperature owning to absorption of the heat from the heat generator and the heat diffusing plate 50 is discharged from the discharge port 17 into a fluid pipe 47, then dissipates the heat via the heat dissipating fins 45 in the process of the flow through the fluid pipe 47, cooled and flown back to the liquid path P from the suction port 16. Thus, the heat generator and the heat diffusing plate 50 are cooled.

The above configuration provides the following effects to the present embodiment. The protrusion 10 for generating pressure is integrally provided on the heat receiving plate 5 and the heat receiving portion 5b is provided on the portion corresponding to the protrusion 10 of the heat receiving surface 5a of the heat receiving plate 5. The heat diffusing plate 50 contacts the heat receiving surface 5a such that the high temperature area S of the heat diffusing plate 50 overlaps with the heat receiving portion 5b. Hence, the heat exchange rate between the heat diffusing plate 50 via the heat receiving plate 5 and the liquid in the liquid path P increases, thereby efficiently cooling the cooling object (heat generator and heat diffusing plate 50).

Since the heat receiving plate 5 is composed separately from the case 4, by composing the heat receiving plate 5 with metallic materials of appropriate heat conductivity rate, a fluid pump 1 and a cooling device 35 having a cooling performance corresponding to the amount of heat generation of the cooling object can be provided. In other words, besides the heat receiving plate 5, common parts can be used for manufacturing fluid pumps 1 and cooling devices 35 of various cooling performances.

The protrusion 10 is arranged to extend from the inner circumferential surface of the pump chamber 2 to the portion beyond the rotational center of the impeller 12. Thus, by enlarging the protrusion 10, enlargement of the area with high flow speed is rendered, thereby improving the heat exchange rate.

The smooth slope 11 is provided on the side portion of the protrusion 10. Hence, the impact of the liquid flowing in the liquid path P colliding with the protrusion 10 can be reduced. The liquid pushed by the pump vanes 22 by the rotation of the impeller 12 collides with the protrusion 10 with high force especially on the side portion of the protrusion 10 in the discharge port 17 side. However, the provision of the slope 11 reduces the occurrence of vibration and noise due to the impact.

The outer circumferential edge of the impeller 12 is formed in a circular arc surface. Such formation facilitates the flow of the liquid in the pump chamber 2, not only in between disc 12a of the impeller 12 and the heat receiving plate 5 but also the cylindrical portion 12b and the inner circumferential surface of the recess 8 and efficiently discharges the liquid in the liquid path P from the discharge port 17.

In the vicinity of the impeller 12, the increased density of the pump vanes 22 hardly allows any liquid flow. Also, the speed of liquid flow in the liquid path P is greater in the outer circumference than in the rotational center. Such being the case, the center of the heat receiving portion 5b is located more outward from the center of the pump chamber 2, that is, the rotational center of the impeller 12. Such configuration all the more improves the heat exchange rate between the heat generator and heat diffusing plate 50 via the heat receiving portion 5b and the liquid in the liquid path P.

Figure 6:
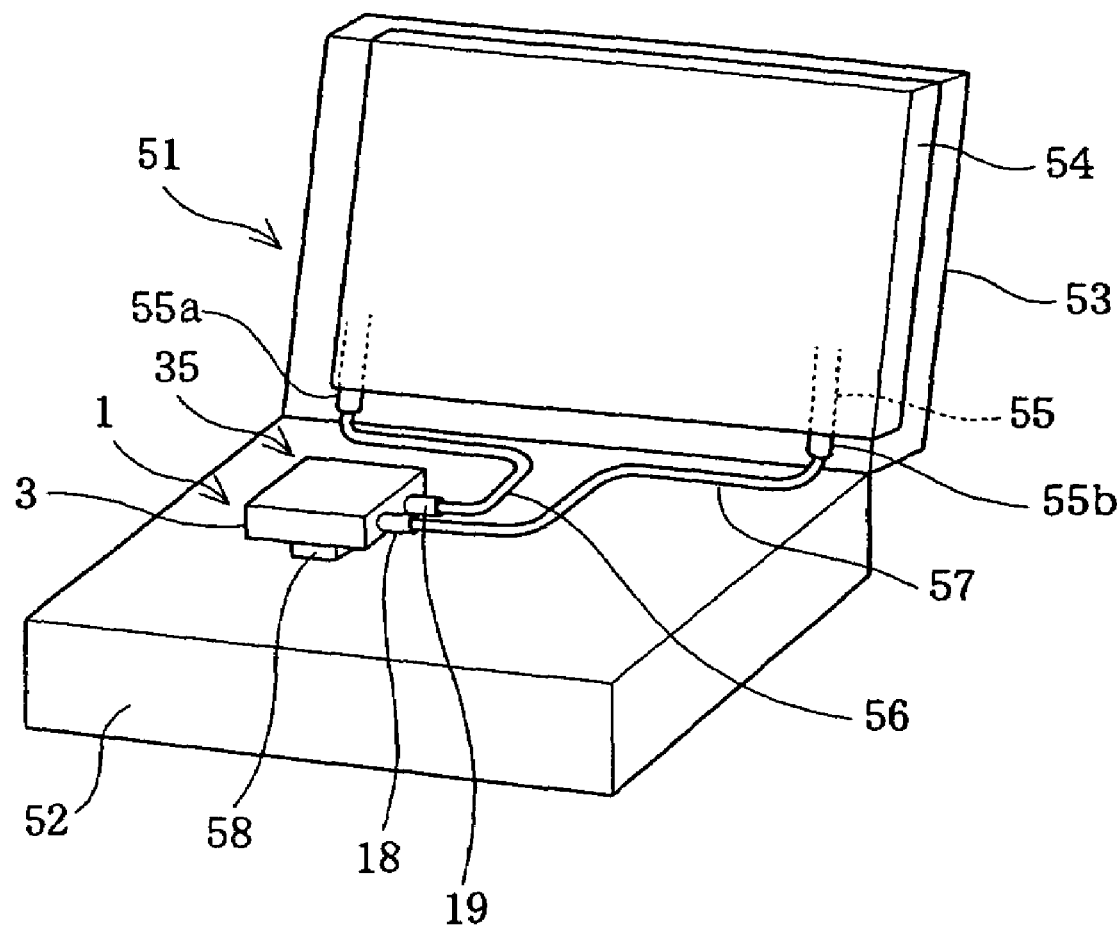
FIG. 6 is a perspective view of a personal computer according to a second embodiment of the present invention.

FIG. 6 shows a second embodiment applying the present invention to a note type personal computer as an electronic appliance. Portions common to the first embodiment are identified with same indications. As shown in FIG. 6, the personal computer is provided with a body case 52 and a lid case 53 rotatably supported to the body case 52. A keyboard (not shown) is provided on the upper surface of the of the body case 52. Also, a liquid crystal display (not shown) is provided on a surface opposite of an upper surface of the body case 52. A heat dissipating plate 54 (corresponds to heat dissipating member) is arranged on the rear surface of the liquid crystal display in the lid case 53. A fluid pipe 55 with cooling liquid sealed in is provided in the heat dissipating plate 54 and an inlet 55a and an outlet 55b are provided on both ends of the fluid pipe 55.

A CPU 58 (corresponding to the heat generator) which is a cooling object is arranged inside the body case 52 and a fluid pump 1 is arranged on the CPU 58. Concretely, the upper surface of the CPU 58 contacts the heat receiving portion 5b (refer FIG. 2 and 3) in the heat receiving surface of the casing 3 of the fluid pump 1.

Also, the discharge port body 19 of the cooling pump 1 connects to the inlet 55a of the fluid pipe 55 via a connection tube 56 and the suction port body 18 is connected to the outlet 55b via a connection tube 57.

A cooling liquid is sealed into the pump chamber 2 and the fluid pipe 55 of the fluid pump 1 and the liquid circulates in the pump chamber 2 (liquid path P) and the fluid pipe 55. In the present embodiment, the cooling device 35 includes the fluid pump 1, the heat dissipating plate 54, the fluid pipe 55 and the connection tubes 56 and 57.

In the above configuration, the heat generated by the CPU 58 is absorbed by the liquid flowing in the fluid path P via the heat receiving portion 5b. Also, the liquid inside the liquid path P which has absorbed the heat of the CPU 58 is discharged from the discharge port 17 into the fluid pipe 55, cooled by the heat dissipating plate 54 and flown back to the liquid path P from the suction port 16. Thus, the CPU is cooled. Therefore, the operation and effect obtained in the first embodiment can likewise be obtained in the present embodiment.

The present invention is not limited to the above described embodiments but may be transformed as follows.

A cooling gas may be sealed in the pump chamber and the fluid pipe of the fluid pump. The rotor of the motor rotationally driving the impeller may be provided outside the pump chamber, separate from the impeller. Also, the entire motor can be arranged outside the casing.

The protrusions may be provided only on the portion opposing the axial direction end surfaces of the impeller in the inner surface of the pump chamber. The size of the protrusions can be changed according to the size of the cooling object.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

We claim:

1. A cooling fluid pump comprising:
    a casing having a cylindrical pump chamber inside and an outer surface, the pump chamber having an inner surface;
    an impeller provided rotatably inside the pump chamber and having a number of pump vanes, the impeller further having an axial end;
    a fluid path defined around the impeller in the pump chamber so that a fluid flows therethrough upon rotation of the impeller;
    a discharge port provided in the casing for discharging the fluid inside the fluid path and a suction port provided in the casing for suctioning the fluid into the fluid path upon rotation of the impeller;
    a protrusion provided on a portion of the inner surface of the pump chamber opposed to the axial end of the impeller, thereby separating the fluid discharged from the discharge port and the fluid suctioned from the suction port as well as pressuring the fluid flowing in the fluid path; and
    a heat receiving portion provided on a part of the outer surface of the casing overlapping the protrusion.

2. The cooling fluid pump according to claim 1, wherein the casing includes a case body having a recess and a metal heat receiving plate provided on the case body so as to cover the recess such that the recess and the metal plate define the pump chamber therebetween, and the protrusion and the heat receiving portion are provided integrally on the heat receiving plate.

3. The cooling fluid pump according to claim 1, wherein the protrusion extends from a portion of the inner surface of the pump chamber located between the suction port and the discharge port to another portion of the inner surface of the pump chamber beyond a center of rotation of the impeller.

4. The cooling fluid pump according to claim 1, wherein the protrusion has at least one side thereof which is located at the discharge port side and is formed into a slope.

5. The cooling fluid pump according to claim 1, wherein the impeller has an outer circumferential edge formed into a slope or a circular arc surface.

6. The cooling fluid pump according to claim 1, wherein the heat receiving portion has a center located outside a rotational center of the impeller.

7. A cooling device comprising:
    a cooling fluid pump including:
        a casing having a cylindrical pump chamber inside and an outer surface, the pump chamber having an inner surface;
        an impeller provided rotatably inside the pump chamber and having a number of pump vanes, the impeller further having an axial end;
        a fluid path defined around the impeller in the pump chamber so that a fluid flows therethrough upon rotation of the impeller;
        a discharge port provided in the casing for discharging the fluid inside the fluid path and a suction port provided in the casing for suctioning the fluid into the fluid path upon rotation of the impeller;
        a protrusion provided on a portion of the inner surface of the pump chamber opposed to the axial end of the impeller, thereby separating the fluid discharged from the discharge port and the fluid suctioned from the suction port as well as pressuring the fluid flowing in the fluid path; and
        a heat receiving portion provided on a part of the outer surface of the casing overlapping the protrusion;
    a fluid pipe having both ends connected to the suction port and the discharge port respectively; and
    a heat dissipating member provided in the fluid pipe.

8. The cooling device according to claim 7, wherein the casing includes a case body having a recess and a metal heat receiving plate provided on the case body so as to cover the recess such that the recess and the metal plate define the pump chamber therebetween, and the protrusion and the heat receiving portion are provided integrally on the heat receiving plate.

9. The cooling device according to claim 7, wherein the protrusion extends from a portion of the inner surface of the pump chamber located between the suction port and the discharge port to another portion of the inner surface of the pump chamber beyond a center of rotation of the impeller.

10. The cooling device according to claim 7, wherein the protrusion has at least one side thereof which is located at the discharge port side and is formed into a slope.

11. The fluid pump according to claim 7, wherein the impeller has an outer circumferential edge formed into a slope or a circular arc surface.

12. The fluid pump according to claim 7, wherein the heat receiving portion has a center located outside a rotational center of the impeller.

13. An electrical appliance comprising:
    a cooling fluid pump including:
        a casing having a cylindrical pump chamber inside and an outer surface, the pump chamber having an inner surface;
        an impeller provided rotatably inside the pump chamber and having a number of pump vanes, the impeller further having an axial end;
        a fluid path defined around the impeller in the pump chamber so that a fluid flows therethrough upon rotation of the impeller;
        a discharge port provided in the casing for discharging the fluid inside the fluid path and a suction port provided in the casing for suctioning the fluid into the fluid path upon rotation of the impeller;
        a protrusion provided on a portion of the inner surface of the pump chamber opposed to the axial end of the impeller, thereby separating the fluid discharged from the discharge port and the fluid suctioned from the suction port as well as pressuring the fluid flowing in the fluid path; and
        a heat receiving portion provided on a part of the outer surface of the casing overlapping the protrusion;
    a fluid pipe having both ends connected to the suction port and the discharge port respectively; and
    a heat generating member directly or indirectly contacting the heat receiving portion of the casing.

14. The electrical appliance according to claim 13, wherein the casing includes a case body having a recess and a metal heat receiving plate provided on the case body so as to cover the recess such that the recess and the metal plate define the pump chamber therebetween, and the protrusion and the heat receiving portion are provided integrally on the heat receiving plate.

15. The electrical appliance according to claim 13, wherein the protrusion extends from a portion of the inner surface of the pump chamber located between the suction port and the discharge port to another portion of the inner surface of the pump chamber beyond a center of rotation of the impeller.

16. The electrical appliance according to claim 13, wherein the protrusion has at least one side thereof which is located at the discharge port side and is formed into a slope.

17. The electrical appliance according to claim 13, wherein the impeller has an outer circumferential edge formed into a slope or a circular arc surface.

18. The electrical appliance according to claim 13, wherein the heat receiving portion has a center located outside a rotational center of the impeller.

* * * * *